United States Patent
Kang et al.

(10) Patent No.: US 7,641,707 B2
(45) Date of Patent: Jan. 5, 2010

(54) REFRIGERATOR HAVING AIR-CLEANER

(75) Inventors: Byeong-Gyu Kang, Gimha (KR);
Sang-Ho Park, Changwon (KR);
Jin-Hyun Kim, Incheon (KR)

(73) Assignee: LG Electronics Inc., Seoul (KR)

(*) Notice: Subject to any disclaimer, the term of this patent is extended or adjusted under 35 U.S.C. 154(b) by 396 days.

(21) Appl. No.: 11/629,491

(22) PCT Filed: Jun. 15, 2005

(86) PCT No.: PCT/KR2005/001829

§ 371 (c)(1),
(2), (4) Date: Dec. 14, 2006

(87) PCT Pub. No.: WO2005/124251

PCT Pub. Date: Dec. 29, 2005

(65) Prior Publication Data

US 2007/0227174 A1    Oct. 4, 2007

(30) Foreign Application Priority Data

| Jun. 15, 2004 | (KR) | 10-2004-0044231 |
| Jun. 15, 2004 | (KR) | 10-2004-0044233 |
| Jun. 15, 2004 | (KR) | 10-2004-0044234 |
| Jun. 15, 2004 | (KR) | 10-2004-0044235 |
| Jun. 15, 2004 | (KR) | 10-2004-0044236 |
| Jun. 23, 2004 | (KR) | 10-2004-0047312 |
| Jul. 27, 2004 | (KR) | 10-2004-0058700 |

(51) Int. Cl.
*F24F 3/16* (2006.01)
*A62B 7/08* (2006.01)

(52) U.S. Cl. .......... 55/385.1; 55/487; 55/493; 55/471; 55/472; 55/473; 65/78; 65/331; 65/314; 65/440; 65/441

(58) Field of Classification Search ........... 55/385.1, 55/487, 493, 471, 472, 473; 62/440, 78, 62/331, 314, 441
See application file for complete search history.

(56) References Cited

U.S. PATENT DOCUMENTS 4,505,131 A  *  3/1985  Boxall ..................... 62/407

(Continued)

FOREIGN PATENT DOCUMENTS

JP       2002-267310       9/2002

(Continued)

OTHER PUBLICATIONS

United Kingdom Office Action dated Aug. 8, 2008.

*Primary Examiner*—Robert A Hopkins
*Assistant Examiner*—Minh-Chau T Pham
(74) *Attorney, Agent, or Firm*—Ked & Associates LLP

(57) ABSTRACT

A refrigerator having an air-cleaner is provided. The refrigerator includes a main body with a predetermined storage space defined therein, and an air-cleaner including a case fixed to the main body and having at least an inlet and outlet, a decor panel that linearly reciprocates to selectively open and close the outlet, a filter device that filters air sucked through the inlet, a blower that sucks air through the inlet and discharges the air filtered in the filter device through the outlet, and an anion generator that generates anions which are discharged along with the air through the outlet. The air-cleaner is securely mounted to the upper surface of the refrigerator.

21 Claims, 7 Drawing Sheets

U.S. PATENT DOCUMENTS

| | | | |
|---|---|---|---|
| 5,568,730 A * | 10/1996 | Kim et al. | 62/78 |
| 5,876,014 A * | 3/1999 | Noritake et al. | 251/129.12 |
| 6,454,841 B1 | 9/2002 | Kaiser | 96/224 |
| 6,471,746 B2 * | 10/2002 | Hagglund et al. | 95/78 |
| 6,494,780 B1 | 12/2002 | Norbury, Jr. | 454/319 |
| 6,797,042 B2 | 9/2004 | LaFerriere et al. | 95/273 |
| 7,465,327 B2 * | 12/2008 | Jang et al. | 55/385.1 |
| 2004/0189164 A1 * | 9/2004 | Hwang | 312/405 |
| 2006/0021360 A1 * | 2/2006 | Kim et al. | 62/126 |
| 2008/0086994 A1 * | 4/2008 | Descotes et al. | 55/471 |

FOREIGN PATENT DOCUMENTS

| | | |
|---|---|---|
| JP | 2004-144342 | 5/2004 |
| KR | 1993-15196 | 7/1993 |
| KR | 10-2005-0012409 | 2/2005 |
| KR | 10-2005-0069321 | 7/2005 |
| WO | WO 00/09961 | 2/2000 |

* cited by examiner

PRIOR ART
[Fig. 1]
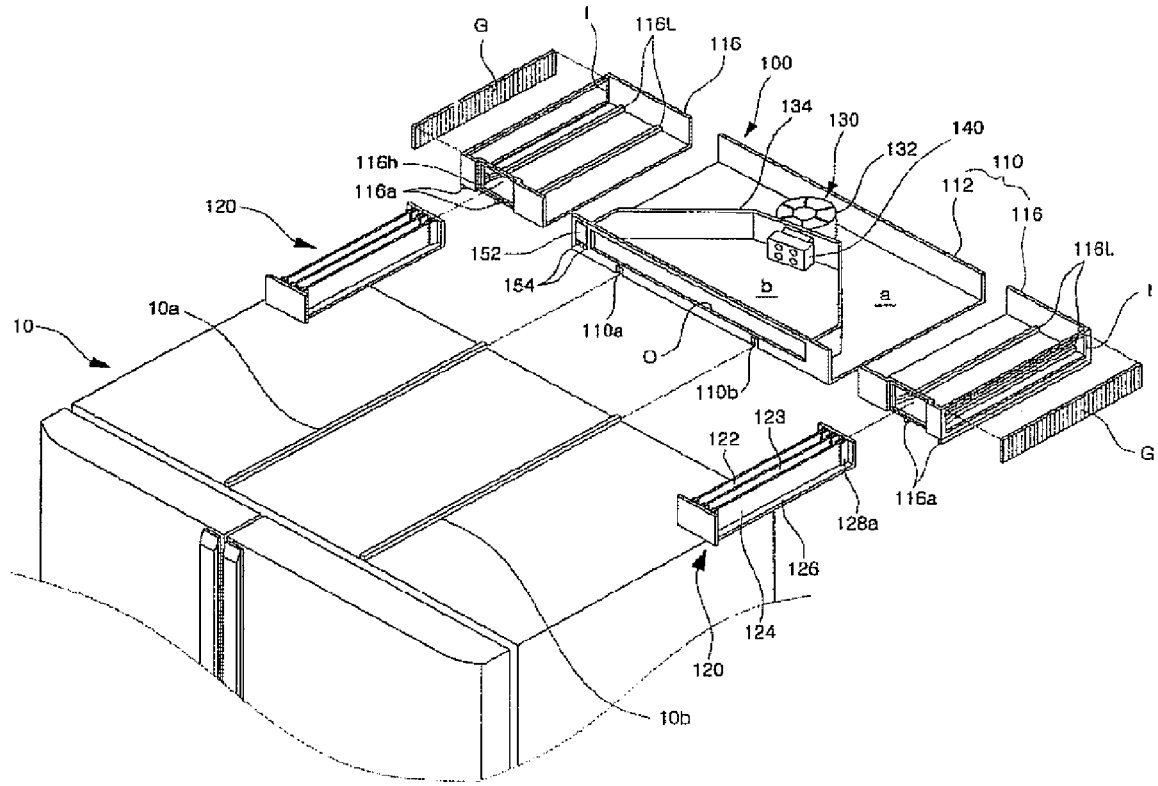
[Fig. 2]
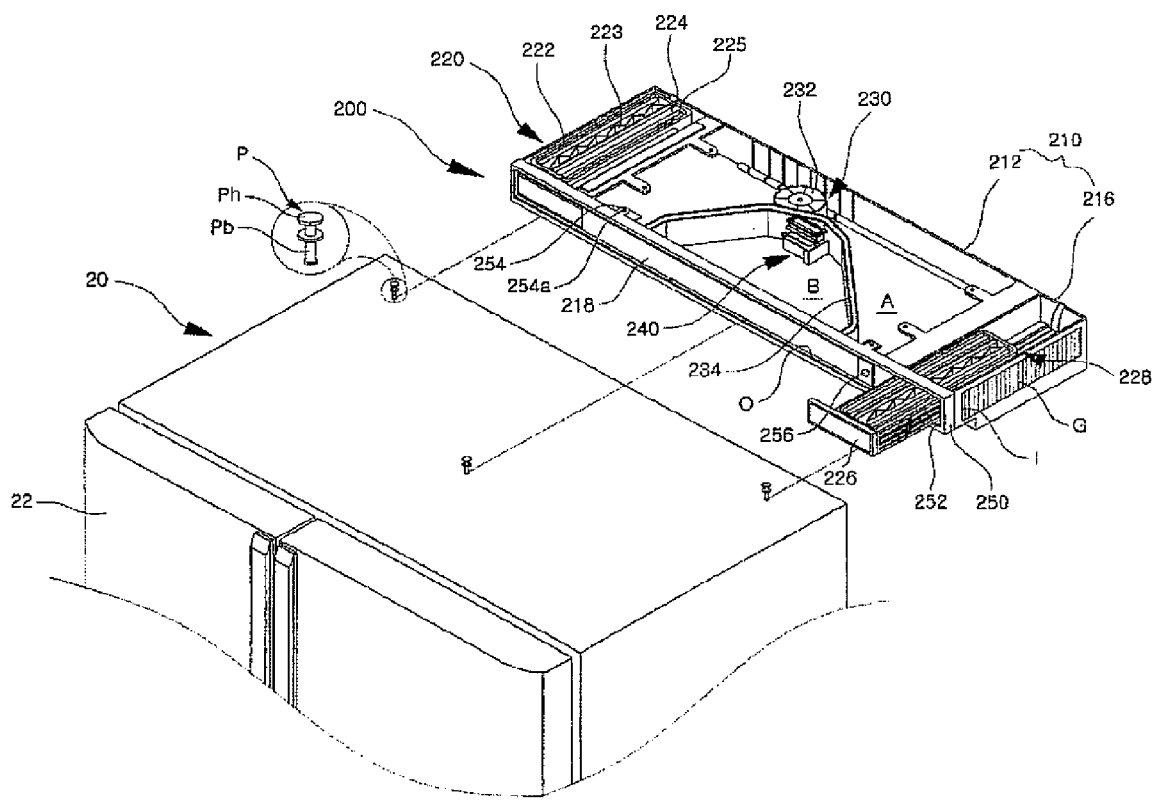

[Fig. 3]
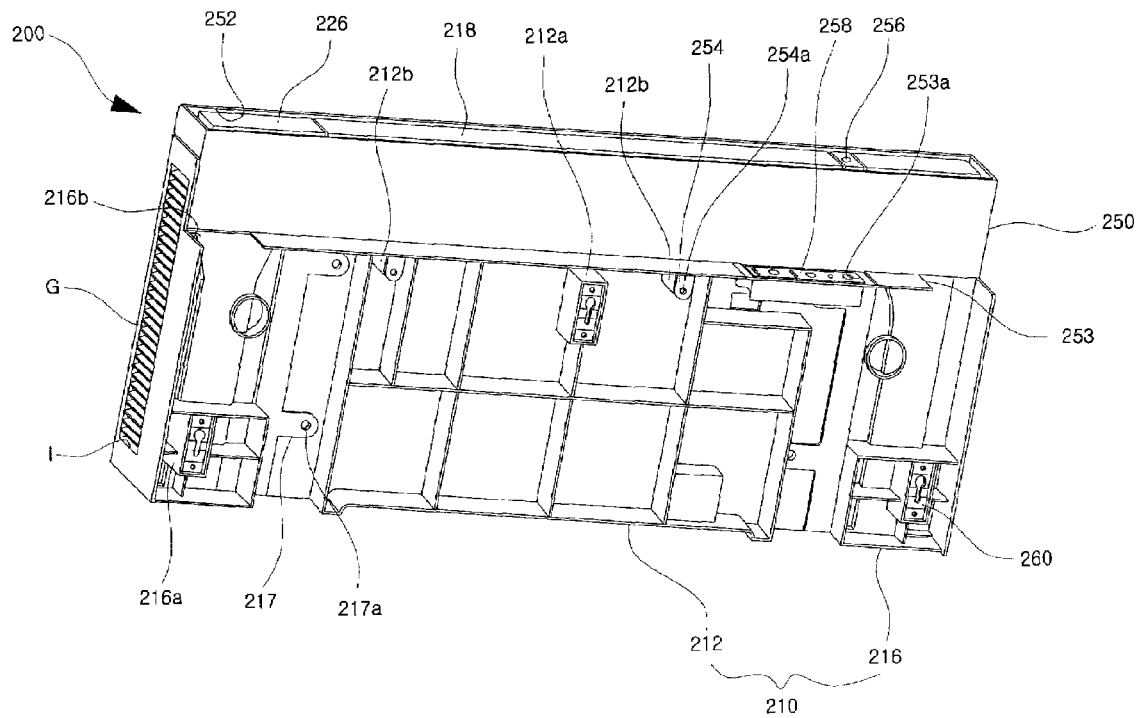
[Fig. 4]
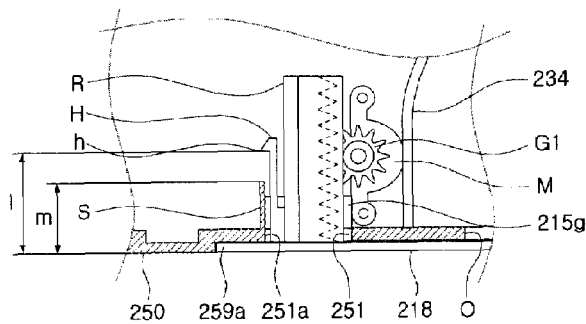
[Fig. 5]
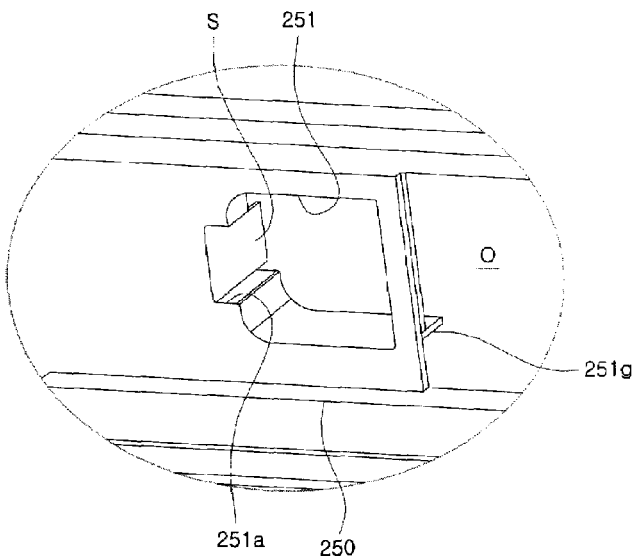

[Fig. 6]
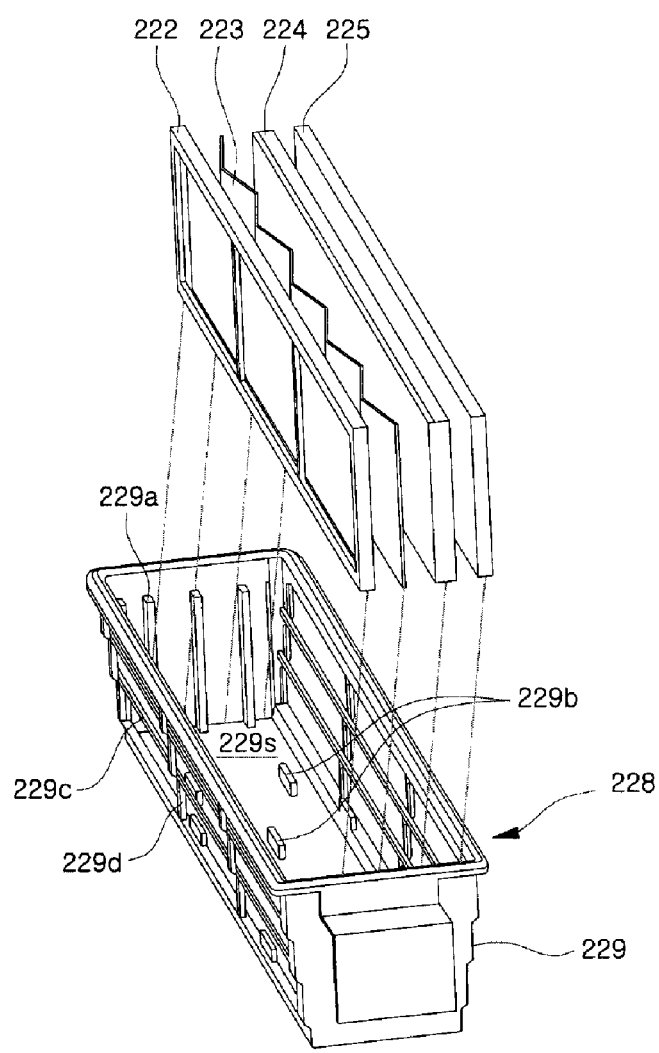
[Fig. 7]
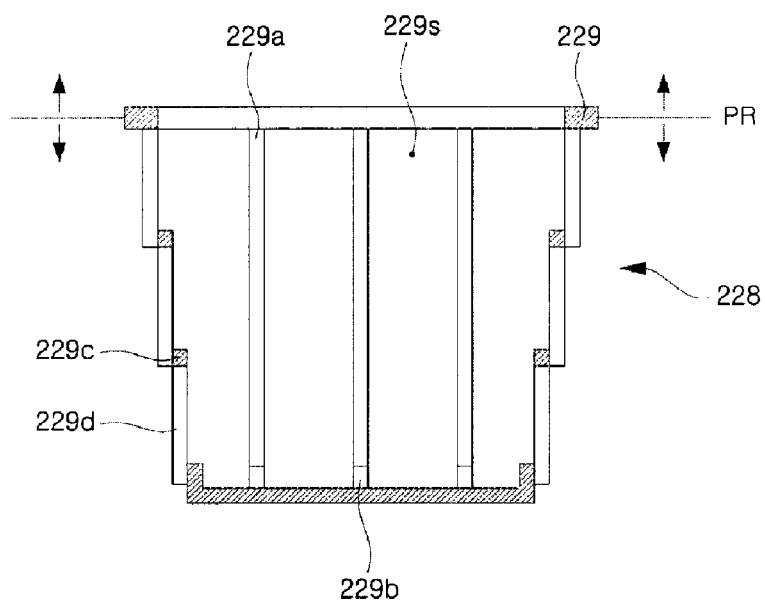

[Fig. 8]
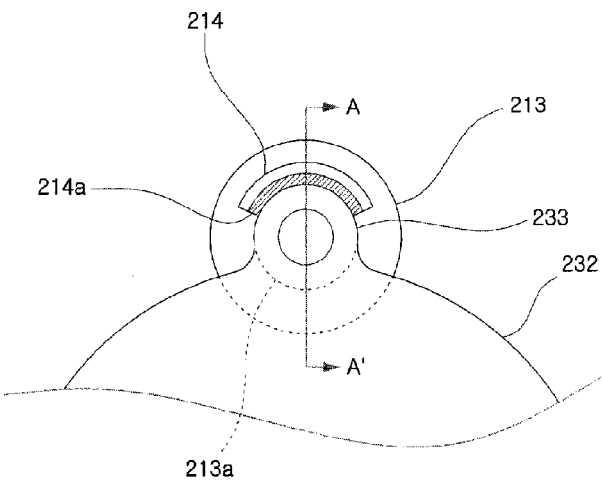
[Fig. 9]
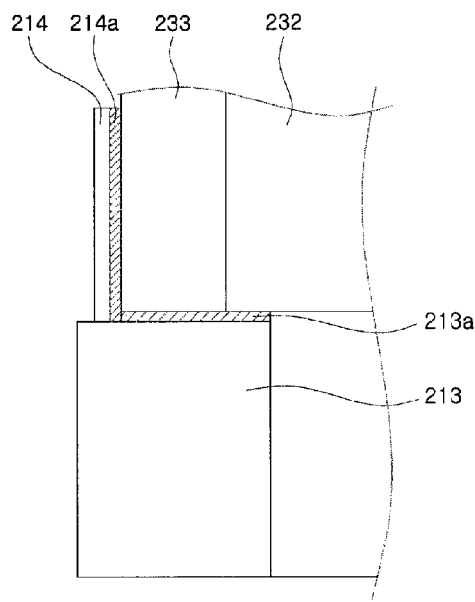
[Fig. 10]
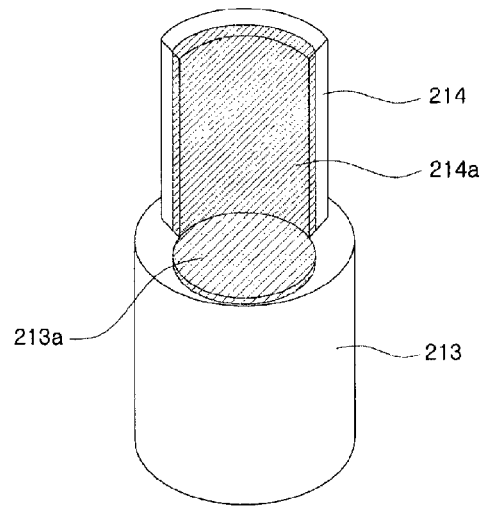

[Fig. 11]
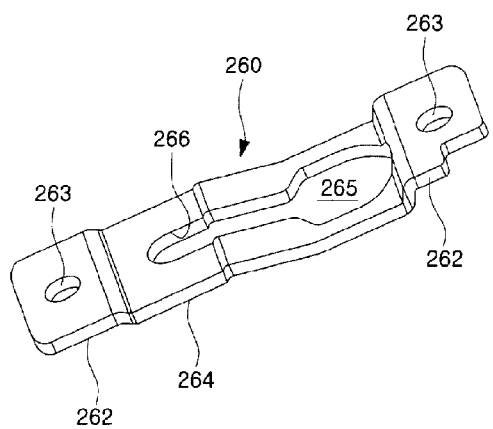
[Fig. 12]
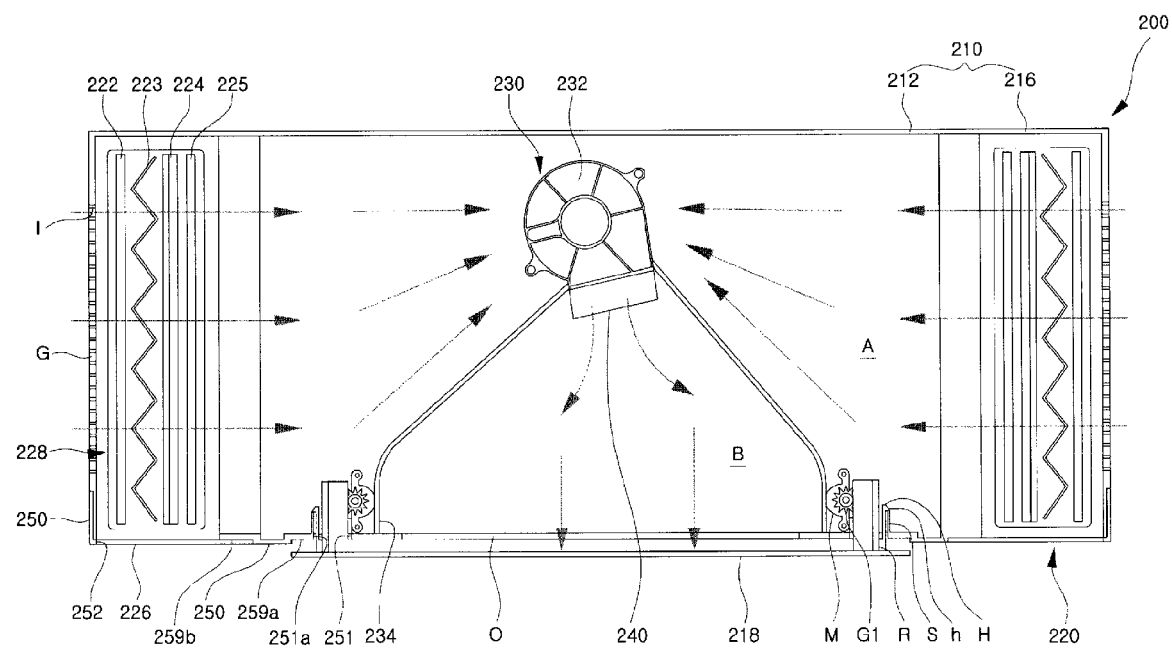

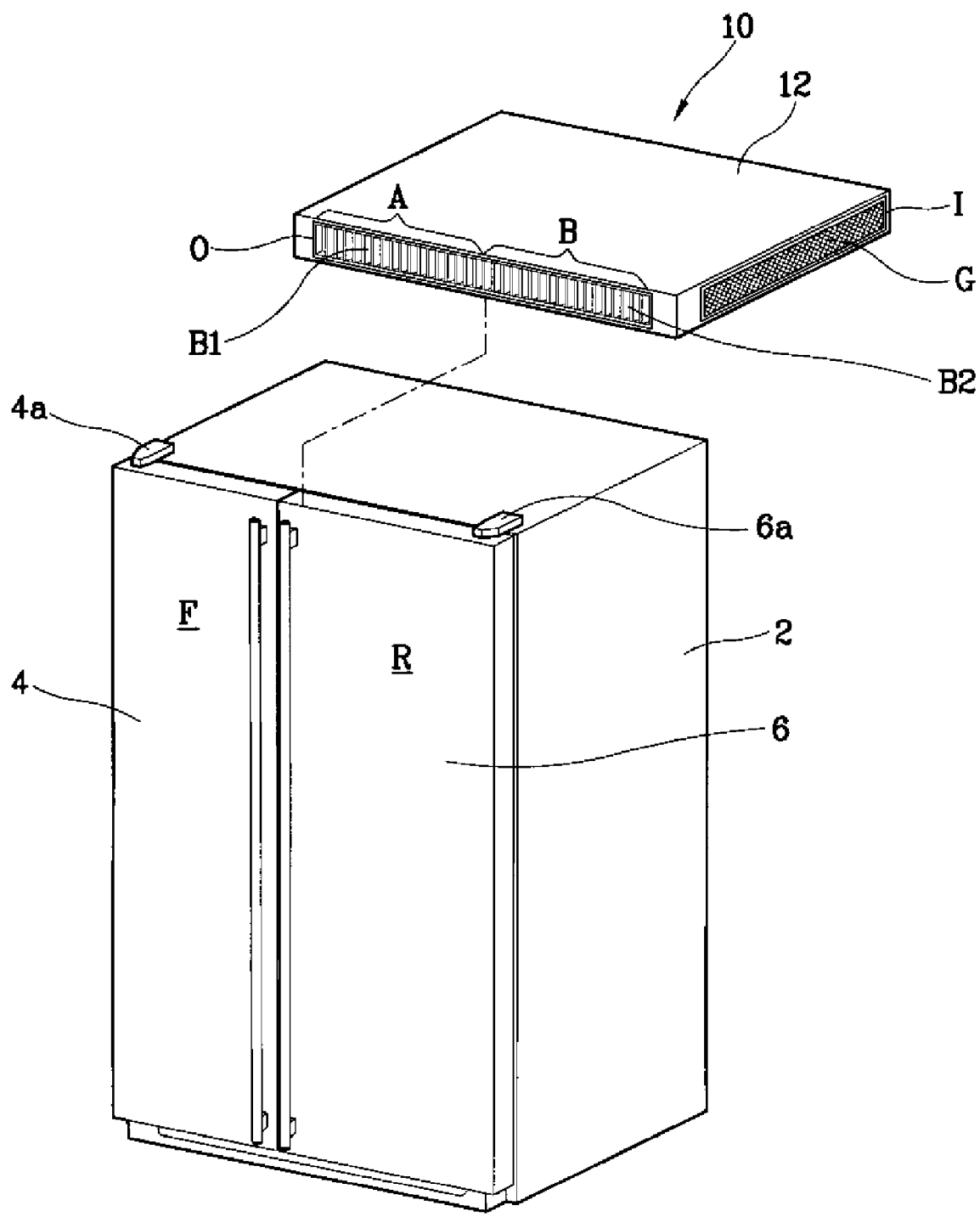
[Fig. 13]

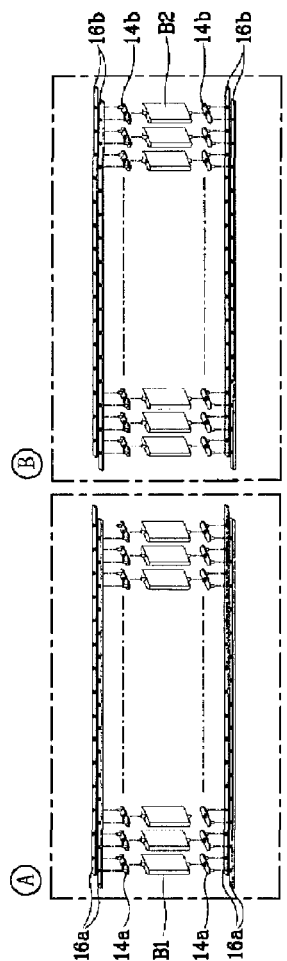
[Fig. 14]
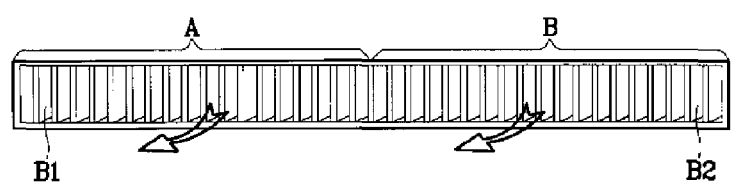
[Fig. 15]
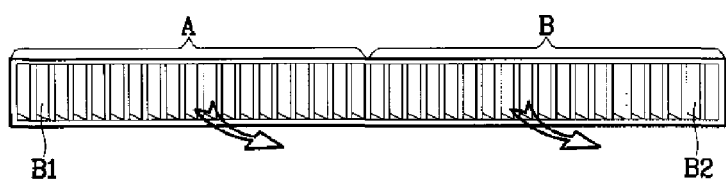
[Fig. 16]
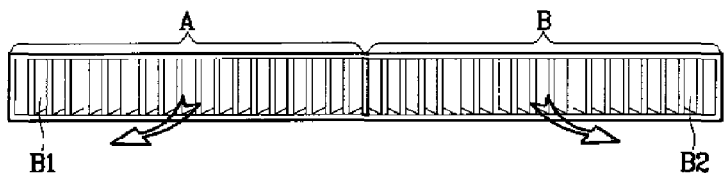
[Fig. 17]

REFRIGERATOR HAVING AIR-CLEANER

TECHNICAL FIELD

The present invention relates to a refrigerator, and more particularly, to a refrigerator in which an air-cleaner for purifying indoor air is provided on an upper surface of a refrigerator main body.

BACKGROUND ART

A refrigerator is an electric appliance for keeping foods fresh for a long time by refrigerating or freezing them. Herein, the present invention will be described in connection to a side-by-side type refrigerator in which a freezing chamber and a refrigerating chamber are formed side by side.

FIG. 1 shows a refrigerator having an air-cleaner according to a prior art.

As shown in the figure, an air-cleaner 100 is detachably mounted on an upper surface of a refrigerator 10. The air-cleaner 100 comprises a case 110, filter units 120, a blower 130, and an anion generator 140. The case 110 is provided with inlets I and an outlet O through which air comes in and out. The filter units 120 serve to filter the air sucked through the inlets I. The blower 130 serves to suck the air through the inlets I and discharge the air filtered in the filter units 120 through the outlet O. The anion generator 140 generates anions to be discharged along with the air through the outlet O.

The case 110 includes a blower case 112 and filter cases 116. The blower case 112 is formed in a flat hexahedral shape with open both ends. The filter cases 116 are in communication with the both ends of the blower case 112. The outlet O is formed in a front surface of the blower case 112. The blower 130 and the anion generator 140 are provided in the blower case 112.

In addition, a pair of guide grooves 110a and 110b are formed in a bottom surface of the blower case 112. A pair of guide rails 10a and 10b, which are provided on the upper surface of the refrigerator 10, are inserted into the guide grooves 110a and 110b.

In the meantime, the inlets I are formed in outer ends of the filter cases 116. The filter units 120 are detachably mounted in the filter cases 116. The filter cases 116 are mounted to be movable from side to side in a state where they are fitted into the blower case 112. A pair of support portions 116a are formed on a bottom surface of each of the filter cases 116. The support portions 116a are supported on the upper surface of the refrigerator 10 so that the filter cases can be flush with the blower case 112.

In addition, a suction grille G is mounted in the inlet I. The suction grille G is provided with a filtering net that serves to filter out foreign materials from the air sucked through the inlets I. A filter mount opening 116h and guide ribs 116L are formed in a front surface and on a floor surface of each of the filter cases 116, respectively. The filter mount opening 116h and the guide ribs 116L are for the purpose of mounting and dismounting the filter unit 120.

The filter unit 120 includes a filter drawer 126, an antibiotic filter 122, a dust collection filter 123, and a deodorizing filter 124. The filter drawer 126 is formed in a substantially hexahedral shape with an open upper face. The filter drawer 126 is mounted in the filter case 116 through the filter mount opening 116h.

Although not shown, the filter case 116 and/or the filter drawer 126 are provided with fasteners. The fasteners serve to prevent the filter drawer 126 from being detached from the filter case 116 inadvertently.

The filter drawer 126 is guided by the guide ribs 116L. In addition, a plurality of guide portions 128a are provided in the filter drawer 126. The guide portions 128a serve to secure the filters 122, 123, and 124.

The antibiotic filter 122, the dust collection filter 123, and the deodorizing filter 124 are provided in the filter drawer 126 in this order from its inner end. The antibiotic filter 122, the dust collection filter 123, and the deodorizing filter 124 serve to remove various kinds of bacteria, dust and odor in air.

The blower 130 comprises a blowing fan (not shown), a fan housing 132, and a driving motor (not shown). An axial flow fan, which sucks air in an axial direction and discharges the sucked air in a radial direction, is used as the blowing fan. The blowing fan is installed in the fan housing 132. The driving motor serves to drive the blowing fan. The fan housing 132 is fastened with screws (not shown) to bosses provided on a floor surface of the blower case 112. When the driving motor drives the blowing fan, air is sucked through a lower portion of the fan housing 132 and discharged forward.

In addition, an air guide 134 is provided in the blower case 112. The air guide 134 guides air sucked by the blower 130 through the inlets I to be discharged through the outlet O. The interior of the blower case 112 is divided by the air guide 134 into a suction channel a and a discharge channel b.

In the meantime, the anion generator 140 is installed at a side of the discharge channel b adjacent to the blower 130. Anions generated in the anion generator 140 are discharged through the outlet Q together with the air blown by the blower 130.

A display 152 is provided at a side of the front surface of the blower case 112. The display 152 serves to display an operational state of the air-cleaner 100 to the outside. In addition, an operating unit 154 is provided at the side of the front surface of the blower case 112 adjacent to the display 152. The operating unit 154 receives a variety of signals for operating the air-cleaner 100.

However, the refrigerator having the air-cleaner according to the prior art has the following problems.

In the prior art, by inserting the guide rails 10a and 10b formed on the upper surface of the main body of the refrigerator 10 into the guide grooves 110a and 110b formed on the bottom surface of the case 110, respectively, the air-cleaner 100 is mounted on the refrigerator. However, there is provided no additional means for preventing the guide rails 10a and 10b from moving in a fore and aft direction in a state where the guide rails 10a and 10b are inserted in the guide grooves 110a and 110b. Thus, due to user s carelessness, the air-cleaner 100 may be inadvertently moved when it is installed.

A plurality of louvers are provided for opening and closing the outlet O and controlling the direction of the air discharged through the outlet O. Therefore, the configurations for pivoting the louvers are required as many as the number of the louvers. Accordingly, there are disadvantages in that the number of parts constructing the article is increased and the man-hour needed for the works is also increased.

In addition, while being connected to each other, the louvers pivot together. Thus, if any one of the louvers abnormally operates, the outlet O is not opened and the air-cleaner 100 cannot operate. That is, there is a problem in that the operational reliability of the air-cleaner 100 is deteriorated.

As described above, the filter drawer 126 is shaped as a hexahedron of which the upper and both side faces are opened, so that the filters 122, 123 and 124 can be mounted or dismounted through the opened faces and the air passing through the filters 122, 123 and 124 can flow through the opened faces. Thus, the filter drawer 126 itself or the filters 122, 123 and 124 may be damaged due to external forces exerted through both side faces of the filter drawer 126.

In order to overcome the foregoing problem, there may be provided support ribs for connecting both ends of the front and rear surfaces of the filter drawer 126. However, when such a filter drawer 126 is provided with the support ribs, there is a disadvantage in that a core is needed in addition to two molds in order to injection mold the filter drawer 126.

In addition, the fan housing 132 is fastened with screws to the bosses provided on the bottom surface of the blower case 112. Therefore, vibration generated when the blowing fan installed in the fan housing 132 operates is transmitted to the air-cleaner 100 and the refrigerator through the fan housing 132 and the bosses. Thus, due to the vibration generated when the air-cleaner operates, noise may occur indoors. In addition, due to the vibration, there are problems in that parts of the refrigerator or the air-cleaner 100 may be damaged or the fastened portions thereof are released, and thus, the durability of the article is deteriorated.

In addition, the direction of the discharged air is controlled by allowing the louvers connected to each other to pivot together. Thus, there is a disadvantage in that various directions of the discharged air cannot be embodied according to the use environment.

DISCLOSURE OF INVENTION

Technical Problem

Accordingly, the present invention is conceived to solve the aforementioned problems in the prior art. An object of the present invention is to provide a refrigerator having an air-cleaner which can be securely mounted to the refrigerator.

Another object of the present invention is to provide a refrigerator having an air-cleaner with a simpler configuration.

A further object of the present invention is to provide a refrigerator having an air-cleaner capable of increasing the operational reliability of the article.

A still further object of the present invention is to provide a refrigerator having an air-cleaner capable of minimizing the damage of filters.

A still further object of the present invention is to provide a refrigerator having an air-cleaner capable of performing the injection molding by means of two molds without using an additional core.

A still further object of the present invention is to provide a refrigerator having an air-cleaner capable of minimizing vibrations generated when the air-cleaner is operated.

A still further object of the present invention is to provide a refrigerator having an air-cleaner capable of discharging purified air in various directions.

Technical Solution

According to an aspect of the present invention for achieving the objects, there is provided a refrigerator, comprising: a main body with a predetermined storage space defined therein; and an air-cleaner including a case fixed to the main body and having at least an inlet and outlet, a decor panel linearly reciprocating to selectively open and close the outlet, a filter unit for filtering air sucked through the inlet, a blower for sucking air through the inlet and discharging the air filtered in the filter unit through the outlet, and an anion generator for generating anions discharged along with the air through the outlet.

Preferably, a gear connected to a step motor is provided in a portion of the case, a rack meshed with the gear is provided on a rear surface of the decor panel to extend in a fore and aft direction, and the rack moves in the fore and aft direction to cause the decor panel to linearly reciprocate in the fore and aft direction of the case when the gear is rotated due to the operation of the step motor.

More preferably, a decor housing defining a front external appearance of the case includes a rack through-opening through which the rack passes, a hook through-opening through which the catching hook passes, and a guide portion for guiding the rack and hook which pass through the rack through-opening and hook through-opening, respectively.

The air-cleaner may further include a stopping means for controlling the linear reciprocation of the decor panel.

Preferably, the stopping means comprises a catching hook provided on one of the case and the decor panel and a stopper provided on the other of the case and the decor panel, and the catching hook is caught to the stopper to prevent the decor panel from being fully detached to the front of the case when the decor panel moves to the front of the case to open the outlet.

The filter unit may include at least a filter for purifying the air sucked through the inlet, a filter basket in which the filter is seated, and a basket drawer which is detachably installed in the case in a state where the filter basket is placed on the basket drawer.

The filter may include an antibiotic filter for eliminating bacteria in the air sucked through the inlet, a first dust collection filter for filtering out oil in the air passed through the antibiotic filter, a second dust collection filter for filtering out dust in the air passed through the first dust collection filter, and a deodorizing filter for removing odor in the air passed through the second dust collection filter.

The filter basket may include a basket main body provided with a filter seating space and shaped as a hexahedron of which an upper face and both longitudinal side faces are opened; a plurality of support ribs provided on both the open side faces of the basket main body and formed stepwise from an entrance of the seating space toward the interior of the basket main body; and a plurality of guide ribs provided on front and rear inner surfaces and floor surface of the basket main body to fix the filter seated in the seating space at a predetermined position, whereby the filter basket is injection molded using two molds.

The air-cleaner may further comprise a vibration prevention means for preventing a vibration generated during the operation of the blower from being transmitted to the air-cleaner and the main body.

The vibration prevention means may include support bosses provided at corresponding positions of ceiling and floor surfaces of the case and having distal ends extending in a direction in which the support bosses face each other to be contiguous to upper or lower surface of the blower; side guides protruding from the distal ends of the support bosses in a direction in which the side guides face each other and formed in a shape corresponding to a side surface of the fan housing; sealing portions provided on the side guides and brought into close contact with the side surface of the fan housing; and shock absorbing portions provided on the distal ends of the support bosses and brought into close contact with the upper or lower surface of the blower.

The refrigerator may further comprise a mounting bracket having a pair of fixing portions fixed to a bottom surface of the case and a fastening portion fastened to an upper surface of the main body, the mounting bracket being configured to mount the air-cleaner to the main body with an elastic force of the fastening portion with respect to the fixing portion.

Preferably, the fixing portion is formed with a fastening hole that a fastener fastened to the bottom surface of the case penetrates, and the fastening portion is provided with a passing hole, which a head of an engaging pin fixed to the upper surface of the main body penetrates, and a slit, to which the head of the engaging pin penetrating the passing hole is fixed by the elastic force in a state where the head is fitted therein.

According to another aspect of the present invention for achieving the objects, there is provided a refrigerator, comprising: a main body with a predetermined storage space defined therein; and an air-cleaner including a case fixed to the main body and having at least an inlet and outlet, a filter unit for filtering air sucked through the inlet, and a blower for sucking air through the inlet and discharging the air filtered in the filter unit through the outlet, wherein the filter unit includes at least a filter for purifying the air sucked through the inlet, a filter basket in which the filter is seated, and a basket drawer which is detachably installed in the case in a state where the filter basket is placed on the basket drawer.

The filter may include an antibiotic filter for eliminating bacteria in the air sucked through the inlet, a first dust collection filter for filtering out oil in the air passed through the antibiotic filter, a second dust collection filter for filtering out dust in the air passed through the first dust collection filter, and a deodorizing filter for removing odor in the air passed through the second dust collection filter.

The filter basket may include a basket main body provided with a filter seating space and shaped as a hexahedron of which an upper face and both longitudinal side faces are opened; a plurality of support ribs provided on both the open side faces of the basket main body and formed stepwise from an entrance of the seating space toward the interior of the basket main body; and a plurality of guide ribs provided on front and rear inner surfaces and floor surface of the basket main body to fix the filter seated in the seating space at a predetermined position, whereby the filter basket is injection molded using two molds.

According to a further aspect of the present invention for achieving the objects, there is provided a refrigerator, comprising: a main body with a predetermined storage space defined therein; and an air-cleaner including a case fixed to the main body and having at least an inlet and outlet, a filter unit for filtering air sucked through the inlet, a blower for sucking air through the inlet and discharging the air filtered in the filter unit through the outlet, and a vibration prevention means for preventing a vibration generated during the operation of the blower from being transmitted to the air-cleaner and the main body, wherein the vibration prevention means includes support bosses provided at corresponding positions of ceiling and floor surfaces of the case and having distal ends extending in a direction in which the support bosses face each other to be contiguous to upper or lower surface of the blower; side guides protruding from the distal ends of the support bosses in a direction in which the side guides face each other and formed in a shape corresponding to a side surface of the fan housing; sealing portions provided on the side guides and brought into close contact with the side surface of the fan housing; and shock absorbing portions provided on the distal ends of the support bosses and brought into close contact with the upper or lower surface of the blower.

According to a still further aspect of the present invention for achieving the objects, there is provided a refrigerator, comprising: a main body with a predetermined storage space defined therein; an air-cleaner including a case fixed to the main body and having at least an inlet and outlet, a filter unit for filtering air sucked through the inlet, and a blower for sucking air through the inlet and discharging the air filtered in the filter unit through the outlet, and a mounting bracket including a pair of fixing portions fixed to a bottom surface of the case and a fastening portion fastened to an upper surface of the main body, the mounting bracket being configured to mount the air-cleaner to the main body with an elastic force of the fastening portion with respect to the fixing portion.

Preferably, the fixing portion is formed with a fastening hole that a fastener fastened to the bottom surface of the case penetrates, and the fastening portion is provided with a passing hole, which a head of an engaging pin fixed to the upper surface of the main body penetrates, and a slit, to which the head of the engaging pin penetrating the passing hole is fixed by the elastic force in a state where the head is fitted therein.

According to a still further aspect of the present invention for achieving the objects, there is provided a refrigerator, comprising: a main body with a predetermined storage space defined therein; and an air-cleaner including a case fixed to the main body and having at least an inlet and outlet, a plurality of louver blades for guiding air discharged through the outlet in at least two directions, a filter unit for filtering air sucked through the inlet, a blower for sucking air through the inlet and discharging the air filtered in the filter unit through the outlet, and an anion generator for generating anions discharged along with the air through the outlet.

Preferably, the louver blades are vertically installed side by side in each of at least two regions into which the outlet is divided, and upper and lower ends of the louver blades installed in each region are connected to each other, respectively.

More preferably, the louver blades installed in the respective regions are rotated selectively in the same or opposite directions.

Furthermore preferably, the outlet is divided into a plurality of regions formed vertically stepwise.

Advantageous Effects

According to a refrigerator having an air-cleaner of the present invention so configured, the following advantages can be expected.

First, the air-cleaner is mounted on a refrigerator main body using engaging pins fixed on the upper surface of the refrigerator main body and mounting brackets fixed on the bottom surface of air-cleaner. At this time, since an elasticity of the mounting brackets keeps the air-cleaner to be mounted on the main body, they can be more securely mounted to each other.

In the meantime, an outlet of the air-cleaner is opened and closed by a decor panel which moves in a fore and aft direction of the air-cleaner. Thus, the number of parts necessary to open and close the outlet can be reduced, so that the article can be simple.

Furthermore, the operation of the decor panel is simply obtained using a pair of combinations of a motor, a gear and a rack. Catching hook and stopper meshed with each other prevent the decor panel from being detached from the air-cleaner. Thus, it is possible to minimize the abnormal operation of the article, so that operational reliability of the article can be increased.

Because of forcible operation of users or abnormal operation of the article, there are cases where the decor panel moves in a state where a portion of the decor panel protrudes to the front of the air-cleaner compared with the other portions thereof. At this time, by correcting the state of the decor panel, the article can normally operate.

In addition, support ribs are provided on both side surfaces of a filter basket, which has openings for allowing the air passing through the filters for purifying air to flow. Therefore, there are advantages in that the filters can be protected and the filter basket is reinforced.

Furthermore, the filter basket can be injection molded using two molds. Thus, it is possible to reduce the man-hour needed for the works and the manufacturing costs of the article.

There are generated vibrations during the operation of a blower for sucking and discharging air into and out of the air-cleaner. However, a vibration prevention means prevents such vibrations from being transmitted to the outside. Therefore, it is possible to prevent the vibrations generated during the operation of the air-cleaner from generating noises or the durability of the article from being deteriorated.

In the meantime, the outlet is divided into a plurality of regions, and louver blades installed in each region are interconnected to each other. Therefore, various directions of the discharged air are embodied according to the respective regions of the outlet, so that it is possible to prevent the interference with obstacles positioned around the air-cleaner and to discharge the purified air into a broad space.

BRIEF DESCRIPTION OF THE DRAWINGS

FIG. 1 is an exploded perspective view showing the interior of a refrigerator having an air-cleaner according to a prior art in a state where a cover of the air-cleaner is removed;

FIG. 2 is a perspective view showing the interior of a refrigerator having an air-cleaner according to the present invention in a state where a cover of the air-cleaner is removed;

FIG. 3 is a perspective view showing a bottom surface of the air-cleaner of the embodiment shown in FIG. 2;

FIG. 4 is a plan view showing that a decor panel is connected to a case in the embodiment shown in FIG. 2;

FIG. 5 is a perspective view showing a portion of a decor housing that is provided with a rack through-opening and a hook through-opening shown in FIG. 2;

FIG. 6 is an exploded perspective view showing filters and a filter basket in the embodiment shown in FIG. 2;

FIG. 7 is a side sectional view showing a molded state of the filter basket of the embodiment shown in FIG. 2;

FIG. 8 is a plan view showing a configuration that a fan housing of the embodiment shown in FIG. 2 is mounted to the case;

FIG. 9 is a sectional view taken along line A-A' of FIG. 8;

FIG. 10 is a perspective view showing a support boss and a side guide shown in FIG. 8;

FIG. 11 is a perspective view showing a mounting bracket shown in FIG. 3;

FIG. 12 is a view showing an airflow state in the embodiment shown in FIG. 2;

FIG. 13 is an exploded perspective view of another embodiment of the refrigerator having the air-cleaner according to the present invention;

FIG. 14 is an exploded perspective view showing louver blades of the embodiment shown in FIG. 13; and FIGS. 15 to 17 are perspective views showing the operational states of the louver blades of the embodiment shown in FIG. 13.

BEST MODE FOR CARRYING OUT THE INVENTION

Hereinafter, a preferred embodiment of a refrigerator having an air-cleaner according to the present invention will be described in detail with reference to the accompanying drawings.

FIGS. 2 and 3 show the interior and a bottom surface of an air-cleaner in the preferred embodiment of the refrigerator having the air-cleaner according to the present invention; FIG. 4 shows that a decor panel is connected to a case in the embodiment shown in FIG. 2; FIG. 5 shows a part of a decor housing including a rack through-opening and a hook through-opening shown in FIG. 2; FIGS. 6 and 7 show filters and a filter basket of the embodiment shown in FIG. 2; FIGS. 8 to 10 show a configuration that a fan housing of the embodiment shown in FIG. 2 is mounted to the case; and FIG. 11 shows a mounting bracket shown in FIG. 3.

Hereinafter, a preferred embodiment of a refrigerator having an air-cleaner according to the present invention will be described in detail with reference to the accompanying drawings.

FIGS. 2 and 3 show the interior and a bottom surface of an air-cleaner in the preferred embodiment of the refrigerator having the air-cleaner according to the present invention; FIGS. 4 and 5 show that a decor panel is connected to a case in the embodiment shown in FIG. 2; FIG. 6 shows filters and a filter basket in the embodiment shown in FIG. 2; FIGS. 7 and 8 show that the filter basket and a basket drawer are fastened to each other in the embodiment shown in FIG. 2; FIGS. 9 and 10 show that the filter basket is mounted in the case in the embodiment shown in FIG. 2; FIGS. 11a and 11b show that a fan housing is mounted to the case in the embodiment shown in FIG. 2; FIGS. 12 and 13 show that a light emitting diode and a printed circuit board are mounted in the case in the embodiment shown in FIG. 2; FIG. 14 shows a mounting bracket shown in FIG. 3; and FIG. 15 shows an airflow state within the air-cleaner in the embodiment shown in FIG. 2.

As shown in FIGS. 2 and 3, an air-cleaner 200 for purifying indoor air is provided on an upper surface of a refrigerator main body 20. An external appearance of the air-cleaner 200 is defined by a case 210. The case 210 includes a blower case 212 and a pair of filter cases 216. The blower case 212 is provided with an outlet O through which filtered air is discharged. Each of the filter cases 216 is provided with an inlet I through which air is sucked into the case 210.

The blower case 212 is formed in a flat hexahedral shape with an open front face and open both ends. An upper face of the blower case 212 is closed with a case cover (not shown). A seating portion 212a and a plurality of fastening bosses 212b are provided on a bottom surface of the blower case 212. A mounting bracket 260, which will be described below, is seated in the seating portion 212a. The seating portion 212a is provided substantially at the center of a front end of the bottom surface of the blower case 212. Fasteners (not shown) penetrating fastening holes 254a of a decor housing 250, which will be described below, are fastened to the fastening bosses 212b.

The outlet O is formed in a front surface of the decor housing 250 provided in front of the blower case 212. There is also provided a decor panel 218 for selectively opening and closing the outlet O. The decor panel 218 taking a shape corresponding to that of the outlet O is formed to be relatively wider laterally than the outlet O. As shown in FIG. 12, the decor panel 218 moves in a fore and aft direction of the blower case 212 and thus opens and closes the outlet O.

In order to operate the decor panel 218, as shown in FIG. 4, there are provided a pair of combinations of a step motor M, a gear G1 and a rack R. The step motors M provide a driving force for moving the decor panel 218. The step motors M are fixed to both sides of the front end of the blower case 212 adjacent to the outlet O. The gear G1, which is connected to a driving shaft of each of the step motors M, is engaged with the rack R. The racks R are provided at both sides of a rear surface of the decor panel 218. The rack R extends rearward to be substantially perpendicular to the rear surface of the decor panel 218 corresponding to the outside of the outlet O.

In addition, a catching hook H is provided at a side of the rack R. The catching hook H prevents the decor panel 218, which moves to the front of the case 210 by operating the step motor M, from being entirely detached from the case 210. The catching hook H extends from the side of the rack R to the rear thereof by a predetermined length.

A proximal end of the catching hook H is secured to a front end of the rack R adjacent to the rear surface of the decor panel 218. A distal end of the catching hook H extends to the rear of the case 210. Thus, the catching hook H has predetermined elasticity in a lateral direction with respect to the rack R. In addition, a catching jaw h is provided at the distal end of the catching hook H. The catching jaw h is caught by a distal end of a stopper, which will be described below.

Referring again to FIG. 2, the filter case 216 is formed in a hexahedral shape elongated in a fore and aft direction. The filter cases 216 are mounted to both ends of the blower case 212 to be movable laterally. Each filter case 216 is open at upper and front faces and both ends thereof. The upper face of the filter case 216 is closed with a case cover (not shown).

An inner end of each filter case 216 is in communication with an open end of the blower case 212. The inlet I is provided at an outer end of each filter case 216. In addition, a suction grille G is mounted in the inlet I. The suction grille G is provided with a filtering net. The filtering nets serve to filter out foreign materials from the air sucked through the inlets I.

In addition, as shown in FIG. 3, a seating portion 216a is provided on a bottom surface of the filter case 216. The mounting bracket 260 is seated in the seating portion 216a. The seating portion 216a is provided at a rear end of the bottom surface of the filter case 216 corresponding to a relatively rear portion as compared with the seating portion 212a of the blower case 212.

Support portions 216b are provided at rear and outer ends of the bottom surfaces of the filter cases 216. The support portions 216b serve to support the case 210 by allowing lower ends of the support portions 216b to be in close contact with the upper surface of the main body 20 when the air-cleaner 200 is seated on the upper surface of the main body 20.

A filter unit 220, which will be described below, is detachably mounted in each of the filter cases 216 via the front face of the filter case 216. In addition, at least a fastening piece 217 is provided at a lower end of the inner end of each filter case 216. The fastening piece 217 enables the blower case 212 and the filter case 216 to be fastened to each other.

The fastening piece 217 horizontally extends from the inner end of the bottom surface of the filter case 216 by a predetermined length. A fastening hole 217a is formed in the fastening piece 217. A fastener (not shown) penetrating the fastening hole 217a is selectively fastened to one of a plurality of fastening holes (not shown) formed in the bottom surface of the blower case 212. Thus, the width of the case 210 can be adjusted along the width of the upper surface of the main body 20. Here, the fastening holes formed in the bottom surface of the blower case 212 are positioned on the traces of the fastening holes 217a of the fastening piece 217 according to the movement of the filter case 216.

Referring again to FIG. 2, there are provided the filter units 220 for purifying the air sucked into the case 210 through the inlets I. The filter unit 220 is installed in the filter case 216 via the open front face of the filter cases 216.

The filter unit 220 includes a plurality of filters 222, 223, 224 and 225, a filter basket 228, and a basket drawer 226. Each of the filters 222, 223, 224 and 225 is formed to take the shape of a panel with a predetermined thickness. The filters 222, 223, 224 and 225 are seated in the filter basket 228. The filter basket 228 is detachably mounted in the filter case 216. The basket drawer 226 fastened to the filter basket 228 is drawn out in a drawer-like fashion.

In the meantime, as shown in FIGS. 6 and 7, the filters 222, 223, 224 and 225 include the antibiotic filter 222, the first and second dust collection filters 223 and 224, and the deodorizing filter 225. The antibiotic filter 222, the first dust collection filter 223, the second dust collection filter 224, and the deodorizing filter 225 are provided in this order from the inlet I. That is, the air sucked through the inlet I passes through the antibiotic filter 222, the first dust collection filter 223, the second dust collection filter 224, and the deodorizing filter 225 in order.

The antibiotic filter 222, which serves to eliminate a variety of bacteria in air, is manufactured by coating both or one surface of a mesh, through which air passes, with antibiotic of silver, copper, or the like. Therefore, the antibiotic filter 222 performs the dust collection function of the mesh itself as well as the antibiotic function of the coated antibiotic.

The first and second dust collection filters 223 and 224 perform the dust collection function, that is, serves to filter out dust from the air passing through the antibiotic filter 222. For example, the first dust collection filter 223 may be formed of a mesh for filtering out oil generated when meat or fish is broiled. Also, the second dust collection filter 224 may be formed by bonding a pair of meshes to each other, which filter out dusts with the different sizes, for example, a mesh for filtering out dust of 0.3 m or more and a mesh for filtering out dust of 0.3 m or less.

The deodorizing filter 225 serves to remove odor in the air which passes through the first and second dust collection filters 223 and 224 and from which dusts are filtered out. The deodorizing filter 225 is generally formed of activated carbon and the like containing carbon. Also, antibiotic may be coated on the surface opposite to the surface of the deodorizing filter 225 adjacent to the second dust collection filter 224.

In the meantime, a basket main body 229 of the filter basket 228 includes a seating space 229s in which the filters 222, 223, 224, and 225 are seated. The basket main body 229 is formed in a substantially hexahedral shape in which an upper face and portions except for upper edges of both longitudinal sides are open. The length and height of the seating space 229s are determined corresponding to those of the filters 222, 223, 224, and 225.

A plurality of guide ribs 229a and 229b are provided on front and rear inner surfaces and a floor surface of the basket main body 229, respectively. The guide ribs 229a and 229b, which serve to guide the filters 222, 223, 224 and 225 seated in the seating space 229s to predetermined positions so that the filters are not brought into close contact with each other, are positioned so that the seating space 229s is divided into four regions side by side.

The side guide ribs 229a among the guide ribs 229a and 229b are formed to extend vertically on the front and rear inner surfaces of the basket main body 229. Further, the floor guide ribs 229b among the guide ribs 229a and 229b, which are provided on the floor surface of the basket main body 229, are formed to have a predetermined length in a fore and aft direction.

In addition, front and rear ends and lower ends of the filters 222, 223, 224, and 225 seated in the seating space 229s are supported with the side guide ribs 229a and the floor guide ribs 229b, respectively. Therefore, when the filters 222, 223, 224, and 225 are seated in the seating space 229s, it is possible to maintain a state where the filters are erected substantially vertically to the floor surface of the basket main body 229.

A plurality of support ribs 229c and 229d are provided on each of both the open side faces of the basket main body 229. The support ribs 229c and 229d, which serve to reinforce the basket main body 229 as well as to protect the filters 222, 223, 224, and 225 seated in the seating space 229s, include the horizontal support ribs 229c and the vertical support ribs 229d.

A plurality of the horizontal support ribs 229c are horizontally provided on both the open side faces of the basket main body 229. At this time, the horizontal support ribs 229c are provided stepwise from an inlet of the seating space 229s toward the interior of the basket main body 229 and are spaced apart by a predetermined gap from each other. For example, each of the front and rear surfaces of the basket main body 229 of a reverse trapezoid shape with an upper end more widened than a lower end is formed to have both sides stepwise shaped, and both ends of each horizontal support rib 229c may be connected to both ends of the front and rear surfaces of the basket main body 229.

A plurality of the vertical support ribs 229d for connecting the horizontal support ribs 229c are provided in a vertical direction. Both ends of each vertical support rib 229d are connected to sides of adjacent horizontal support ribs 229c or to a side of the horizontal support rib 229c and a side of an upper end edge or floor edge of each of a side surface of the basket main body 229. At this time, the vertical support ribs 229d are fixed to outer surfaces of the horizontal support ribs 229c and extend sequentially from the upper end edges to the floor edges of the side surfaces of the basket main body 229.

Unexplained reference numeral PR in FIG. 7 denotes a parting line on which upper and lower molds for injection molding the filter basket 228 are in contact with each other.

The basket drawer 226 is formed in a hexahedron shape of which the upper and both side faces are opened and extend in a fore and aft direction. The front surface of the basket drawer 226 is formed to be relatively larger than a filter mount opening 252 of the decor housing 250, which will be described below, and the rear surface of the basket drawer 226 is formed to be relatively smaller than the filter mount opening 252.

In addition, the basket drawer 226 moves in the fore and aft direction through the open front face of the filter case 216, so that the basket drawer 226 is mounted and dismounted in and out of the filter case 216. That is, in a state where the filter basket 228 in which the filters 222, 223, 224, and 225 are seated is put on the basket drawer 226, the basket drawer 226 is housed in or drawn out of the filter case 216.

Although not shown, there may be provided a fixing means for preventing the basket drawer 226 from moving inadvertently in a state where the basket drawer 226 is housed in the filter case 216. Furthermore, there may be provided a guide means for guiding the movement of the basket drawer 226.

In the meantime, a blower 230 is provided in the blower case 212. The blower 230 serves to suck air through the inlets I and to discharge the air purified in the filter units 220 to the outside through the outlet O. The blower 230 comprises a blowing fan (not shown), which sucks air in an axial direction and discharge the sucked air in a radial direction, a fan housing 232 in which the blowing fan is installed, and a driving motor (not shown) for driving the blowing fan.

An intake portion (not shown), through which the air sucked through the inlets I is introduced, is provided in a lower surface of the fan housing 232. Further, an exhaust portion (not shown), through which the air introduced into the fan housing 232 through the intake portion and compressed by the blowing fan is discharged, is provided in a front surface of the fan housing 232.

In order to support the upper and lower surfaces of the fan housing 232, there are provided support bosses 213. The support bosses 213 protrude at corresponding positions of the ceiling and floor surfaces of the blower case 212 by a predetermined length in the direction in which they face each other. A distal end of each support boss 213 is positioned adjacent to a fastening protrusion 233 provided on a side of the fan housing 232. Such support bosses 213 secure a predetermined space for allowing air to flow between the floor surface of the blower case 212 and the lower surface of the fan housing 232.

As shown in FIGS. 8 to 10, the distal end of each support boss 213 is provided with a shock absorbing portion 213a. The shock absorbing portion 213a, which is formed of the material with a predetermined elasticity for absorbing the vibrations generated during the operation of the blower 230, preferably has the thickness relatively larger than the distance between the distal end of the support boss 213 and the upper or lower surface of the fan housing 232.

Furthermore, the distal end of the support boss 213 is provided with a side guide 214. The side guide 214, which is for the purpose of supporting a side surface of the fan housing 232, is formed in a fan shape with a predetermined central angle corresponding to the shape of the fastening protrusion 233. A sealing portion 214a is provided on an inner surface of the side guide 214. The sealing portion 214a serves to prevent the vibrations of the blower 230 from being transmitted to the air-cleaner 200 and the refrigerator through the fastening protrusions 233 and the side guide 214.

In the meantime, as shown in FIG. 2, an air guide 234 is provided in the blower case 212. The air guide 234 serves to divide the interior of the blower case 212 into a suction channel A and a discharge channel B. The suction channel A causes the air sucked through the inlets I to be guided to the intake portion of the fan housing 232.

Then, the discharge channel B causes the air discharged through the exhaust portion of the fan housing 232 to be guided to the outlet O. In addition, an aperture (not shown), which is in communication with the exhaust portion of the fan housing 232, is formed in a side of the air guide 234.

In the meantime, an anion generator 240 is provided in the blower case 212. The anion generator 240 is positioned in the discharge channel B. Anions generated in the anion generator 240 are discharged through the outlet O together with the air blown by the blower 230.

As shown in FIGS. 2 and 3, the decor housing 250 is provided in the front end of the case 210. The decor housing 250 includes front, upper, lower, and both side surface portions so as to enclose the open front face and edges of the front end of the case 210 in a state where the blower case 212 and the filter cases 216 are fastened to each other.

Referring again to FIGS. 4 and 5, the outlet O rack through-openings 251, the filter mount openings 252 are formed in the front surface of the decor housing 250. The outlet Q is positioned at the front end of the discharge channel B. The respective racks R move through the rack through-openings 251. The basket drawers 226 are mounted in the filter cases 216 through the filter mount openings 252, respectively.

In addition, a hook through-opening 251a is formed to be in communication with a side of each rack through-opening 251. The hook through-opening 251a is formed in a shape corresponding to the catching hook H. The catching hooks H penetrate the hook through-openings 251a. Stoppers S are provided on a front inside surface of the decor housing 250.

The stoppers S serve to prevent the decor panel 218 from being completely dismounted toward the front of the case 210. Each of the stoppers S extends to the rear of the case 210 from a side of the hook through-opening 251a corresponding to the catching hook H. When the decor panel 218 moves to the front of the case 210 and thus the outlet O is opened, the catching jaws h of the catching hooks H are caught by the front ends of the stoppers S.

A length m of the stopper S is formed to be relatively shorter than a length 1 of the catching hook H. In the illustrated embodiment, if the length l from front end of the catching hook H to the catching jaw h is about 15 mm and the length m of the stopper S is about 10 mm, the decor panel 218 protrudes from the outlet m by about 5 mm. However, it is possible to modify the catching hook H and the stopper S diversely.

In the meantime, an edge of the rack through-opening 251 and the hook through-opening 251a except the stopper S is provided with a guide portion 251g. The guide portion 251g serves to guide the movement of the rack R and catching hook H. The guide portion 251g extends rearward perpendicularly to the front inside surface of the decor housing 250 by a predetermined length form the edge of the rack through-opening 251 and hook through-opening 251a.

Panel seating steps 259a and the drawer seating steps 259b are provided in the front surface of the decor housing 250 (see FIG. 12). The panel seating steps 259a and the drawer seating steps 259b are formed to have a size and shape corresponding to the decor panel 218 and the basket drawers 226, respectively.

The decor panel 218 is seated on the panel seating steps 259a when the outlet O is closed. The basket drawers 226 are seated on the drawer seating steps 259b when the filter baskets 228 are mounted in the filter cases 216.

In addition, referring to FIGS. 2 and 3, a plurality of fastening pieces 254 are provided on upper and lower surfaces of the decor housing 250. The fastening hole 254a is formed in each of the fastening pieces 254. The fasteners (not shown) for fixing the decor housing 250 to the case 210 penetrate through the fastening holes 254a.

An operating unit 256 is provided on a side of the front surface of the decor housing 250 between the outlet O and the filter mount opening 252. The operating unit 256 receives signals for operating the air-cleaner 200.

As shown in FIG. 3, a mount flange 253 is provided on a rear end of a lower surface of the decor housing 250. The mount flange 253 is placed at a position spaced part by a predetermined distance rearward from the front end of the case 210.

A mount hole 235 is formed in the mount flange 253. A display 258 is mounted in the mount hole 235. The display 258 shows a variety of information on the operation of the air-cleaner 200.

The display 258 is installed such that its front surface is positioned to be flush with the front surfaces of the main body 20 and the mount flange 253. Thus, when doors 22 installed to the main body 20 are opened, the display 258 is exposed to the outside. However, when the doors 22 are closed, the display 258 is not exposed to the outside.

In addition, in order to provide a unified front appearance of the air-cleaner 200, it is preferred that the decor panel 218, the basket drawer 226 and the decor housing 250 be formed of the same material. For example, the decor panel 218, the basket drawer 226 and the decor housing 250 may be formed of an identical ABS resin.

As shown in FIG. 3, there are provided the mounting brackets 260 for mounting the air-cleaner 200 to the main body 20. As shown in FIG. 11, each of the mounting brackets 260 includes a pair of fixing portions 262 and a fastening portion 264. The fixing portions 262 are fixed to the bottom surface of the case 210. Then, the fastening portion 264 is coupled to the upper surface of the main body 20. The mounting brackets 260 allow the air-cleaner 200 to be mounted to the upper surface of the main body 20 with an elastic force of the fastening portions 264 with respect to the fixing. portions 262.

The fixing portions 262 are provided at both ends of the fastening portion 264. A fastening hole 263 is formed in each of the fixing portions 262. In a state where the mounting brackets 260 are seated in the seating portions 212a and 216a of the case 210, screws (not shown) penetrating through the fastening holes 263 are fastened into fastening holes (not shown) formed in the seating portions 212a and 216a.

The fastening portion 264 is formed to be inclined at a predetermined angle with respect to the fixing portions 262. A passing hole 265 and an engaging slit 266 are formed in the fastening portion 264. The passing hole 265 is formed to have a shape corresponding to a head Ph of an engaging pin P fixed to the upper surface of the main body 20. The engaging slit 266 is in communication with the passing hole 265.

In a state where the head Ph of the engaging pin P penetrates through the passing hole 265, a body Pb of the engaging pin P moves along the engaging slit 266. At this time, the elastic force with which the head Ph pushes the fastening portion 264 causes the fastening portion 264 to be fastened to the upper surface of the main body 20.

Hereinafter, the operation of the refrigerator having the air-cleaner according to the present invention thus configured will be described.

The process where the air-cleaner of the preferred embodiment of the refrigerator having the air-cleaner according to the present invention is mounted to the upper surface of the refrigerator main body will be described.

First, the mounting brackets 260 are seated in the seating portions 212a and 216a of the case 210. Then, the fixing portions 262 of the mounting brackets 260 are fixed to the bottom surface of the case 210.

Then, the head Ph of each engaging pin P provided on the upper surface of the main body 20 passes through each passing hole 265 formed on the fastening portion 264 of the mounting bracket 260. In such a state, the air-cleaner 200 is drawn to the front of the main body 20. Therefore, the body Pb of the engaging pin P moves along the engaging slit 266. At this time, the elastic force which causes the head Ph to push the fastening portion 264 causes the air-cleaner 200 to be mounted on the upper surface of the main body 20. In addition, the support portion 216b of the case 210 is brought into close contact with the upper surface of the main body 20, so that the air-cleaner 200 is supported.

Since the mounting bracket 260 causes the air-cleaner 200 to be mounted on the upper surface of the main body 20 as described above, the air-cleaner 200 is more securely mounted. Further, a worker without a specific technique can also easily mount the air-cleaner 200 on the upper surface of the main body 20.

Next, the operational process of such an air-cleaner will be described in detail with reference to the accompanying drawings.

FIG. 12 shows an airflow state in the air-cleaner in the preferred embodiment of the refrigerator having the air-cleaner according to the present invention.

As shown in the figure, a signal for operating the air-cleaner 200 is first input by operating the operating unit 256. If the operational signal is input as above, the step motors M cause the gears G1 to rotate. Then, the racks R engaged with the gears G1 move through the rack through-openings 251. Thus, the decor panel 218 moves to the front of the case 210 and then the outlet O is opened.

At this time, the catching hooks H also penetrate through the hook through-openings 251a and then move to the front of the case 210. Then, when the catching hooks H move by a predetermined distance, the catching jaws h of the catching hooks H are brought into close contact with the distal ends of the stoppers S, respectively. Therefore, the decor panel 218 does not further move to the front of the case 210.

That is, the decor panel 218 moves to the front of the case 210 by a distance between the catching jaw h of the catching hook H and the distal end of the stopper S. Therefore, even though the step motor M is driven further than the preset value due to its malfunction, the decor panel 218 is not fully detached from the case 210.

Further, when a user draws the decor panel 218 forcibly to the front of the case 210 or pushes it to the rear of the case 210, it is difficult to uniformly apply external forces to both sides of the decor panel 218. Therefore, for example, the left side of the decor panel 218 moves more rapidly than the right side thereof, and thus, can protrude from the front surface of the case 210.

In such a state, when the air-cleaner 200 operates by manipulating the operating unit 256, the step motors M are driven and thus the gears G1 rotate. Then, the racks R meshed with the gears G1 move. Therefore, the decor panel 218 moves to the front of the case 210, so that the outlet O is opened.

However, since the decor panel 218 is in a state where the left side thereof protrudes relatively more than the right side thereof, the left side of the decor panel 218 stops by means of the catching hook H and the stopper S earlier than the right side thereof. At this time, until the right side of the decor panel 218 stops by means of the catching hook H and the stopper S, the right side of the decor panel 218 continues to move to the front of the case 210. Therefore, any one side of the decor panel 218 does not protrude from the front surface of the case 210 and becomes parallel with the front surface of the case 210.

When the blower 230 operates, air is sucked into the case 210 through the inlets I.

At this time, the filtering nets of the suction grilles G filter out relatively large dust of foreign materials from the air sucked through the inlets I. Then, the air passing through the filtering nets of the suction grilles G is purified while passing through the filters 222, 223, 224, and 225 in order.

That is, while the air passes the antibiotic filters 222, dust is filtered out at the same time bacteria are eliminated. While the air passes through the first and second dust collection filters 223 and 224, oil generated when meat and fish is broiled and dust are filtered out. Then, the deodorizing filters 225 remove odor in the air. Also, antibiotic coated on the deodorizing filters 225 eliminates bacteria that are not eliminated in advance. Therefore, the filters 222, 223, 224, and 225 cause air to be purified more effectively.

The air purified as above is guided to the blower 230 by the suction channel A. At this time, the air passing through the filters 222, 223, 224, and 225 is introduced into the intake portion of the fan housing 232 via the space between the floor surface of the case 210 and the lower surface of the fan housing 232 that is defined by the support bosses 213.

The continuous operation of the blower 230 causes the air introduced through the intake portion of the fan housing 232 to be discharged to the exhaust portion of the fan housing 232. The air discharged through the exhaust portion of the fan housing 232 is guided by the discharge channel B and then discharged into the interior of a room through the outlet O.

At this time, the air discharged through the outlet O is discharged together with anions generated in the anion generator 240. In addition, the air discharged through the outlet O is guided by the rear surface of the decor panel 218 and thus discharged upwards and downwards.

Meanwhile, in order to stop the operation of the air-cleaner 200, the operational signal is input by operating the operating unit 256. The input operational signal causes the blower 230 to stop. Thus, air is not sucked and discharged through the inlets I and the outlet O.

The step motors M operate in a direction opposite to the direction in which they cause the decor panel 218 to move to the front of the case 210. Accordingly, the operation of the step motors M causes the gears G1 to rotate. Then, the rotation of the gears G1 causes the racks R to move to the rear of the case 210 through the rack through-openings 251.

When the racks R move as above, the catching hooks H also move to the rear of the case 210. Therefore, the catching jaws m are spaced apart from the distal ends of the stoppers S from a state where the catching jaws h are in close contact with the distal ends. Then, the decor panel 218 moves to the rear of the case 210. Therefore, the decor panel 218 closes the outlet O. At this time, the decor panel 218 is seated in the panel seating steps 259a, so that the decor panel 218 no more moves to the rear of the case 210.

In the meantime, the shock absorbing portions 213a and the sealing portions 214a provided between the fan housing 232 and the support bosses 213 and side guides 214 absorb the vibrations generated from the operation of the blower 230. Therefore, the vibrations of the blower 230 are not transmitted to the outside through the case 210 and the refrigerator main body 20. Accordingly, it is possible to prevent the operation of the air-cleaner from generating noises or the durability of the article from being deteriorated.

Next, a process of manufacturing the filter basket of the preferred embodiment of the refrigerator having the air-cleaner according to the present invention will be described.

The filter basket 228 is manufactured through an injection molding. However, the support ribs 229c and 229d are formed stepwise to the interior of the basket main body 229. Therefore, basket main body 229 and the support ribs 229c and 229d do not vertically overlap with each other.

If it is designed in such a manner that the basket main body 229 and the support ribs 229c and 229d do not vertically overlap with each other, an additional core except two molds consisting of upper and lower molds with respect to the parting line PR is not required, when the filter basket 228 is injection molded. Therefore, the man-hour needed for the works and the manufacturing costs of the article are reduced.

MODE FOR THE INVENTION

Hereinafter, another embodiment of a refrigerator having an air-cleaner according to the present invention will be described in detail with reference to the accompanying drawings.

FIG. 13 shows the other embodiment of the refrigerator having the air-cleaner according to the present invention, and FIG. 14 shows louver blades of the embodiment shown in FIG. 13.

As shown in the figures, a freezing chamber F and a refrigerating chamber R are defined side by side in a refrigerator main body 2. A freezing chamber door 4 and a refrigerating chamber door 6 for selectively opening and closing the freezing chamber F and the refrigerating chamber R are pivotably installed on the front surface of the main body 2 through hinge assemblies 4a and 6a.

An air-cleaner 10 is provided on the upper surface of the main body 2. An external appearance of the air-cleaner 10 is defined by a case 12. The case 12 is formed with inlets I and an outlet O. A plurality of louver blades B1 and B2 are installed in regions A and B of the outlet O respectively, in order to embody various directions of the discharged air in the respective regions A and B.

The inlets I are provided in both side surface of the case 12, while the outlet O is provided in the front surface of the case 12. The case 12 includes therein filter units (not shown) for filtering the air sucked through the inlets I, a blower (not shown) for sucking the air through the inlets I and discharging the air purified in the filter units through the outlet O and an anion generator (not shown) for generating anions that are discharged along with the air through the outlet O. In addition, the case 12 includes therein a controller (not shown) for supplying the various parts with power and controlling the operation thereof.

Furthermore, it is preferred that air guides (not shown) for guiding the flow of the air blown by the blower be provided in the case 12. Each inlet I is provided with a suction grille G. The outlet O is equipped with a plurality of the louver blades B1 and B2 that are vertically in parallel.

As shown in FIG. 13, the louver blades B1 and B2 consist of a plurality of the first louver blades B1 installed in the region A of the outlet O to be connected to each other and a plurality of the second louver blades B2 installed in the other region B of the outlet O to be connected to each other. It is preferred that the first louver blades B1 cooperate with each other separately from the second louver blades B2 cooperating with each other so that the directions of the air discharged from the respective regions A and B of the outlet O can be controlled independently of each other.

Here, upper and lower ends of the first and second louver blades B1 and B2 are installed in the regions A and B of the outlet O, respectively so that the first and second louver blades B1 and B2 are rotatable in the respective regions. The first louver blades B1 are connected to one another by means of rotating links 14a and a pair of levers 16a to cooperate with one another, while the second louver blades B2 are connected to one another by means of rotating links 14b and a pair of levers 16b to cooperate with one another. A set of the first louver blades B1, the rotating links 14a and the pair of levers 16a and another set of the second louver blades and B2, the rotating links 14b and the pair of levers 16b may be installed to be connected to one another by means of a variety of assembly grooves and protrusions, assembly screws, or the like.

At this time, at least one of the rotating links 14a connected to the first louver blades B1 is connected to an additional first step motor (not shown). At least one of the rotating links 14b connected to the second louver blades B2 is connected to an additional second step motor (not shown). The first and second step motors are connected to the controller for supplying power and controlling the operation. A user may rotate the first and second louver blades B1 and B2 by hand to adjust them.

According to user s selection, the controller controls the first and second louver blades B1 and B2. At this time, by controlling the first and second louver blades B1 and B2 to rotate in the same direction, the controller can control the purified air to be discharged from the outlet m only in the same direction. Further, by controlling the first and second louver blades B1 and B2 to rotate in the opposite directions, the controller can control the purified air to be discharged from the outlet O in two directions at a time.

In the meantime, there are provided a plurality of the outlets O vertically stepwise formed. A plurality of the louver blades are vertically installed side by side in the stepwise outlets O. For example, there are the upper and lower outlets O, the louver blades in each outlet may be installed to cooperate with each other. In such a case, the louver blades installed in the upper outlet rotate in a direction to discharge the purified air in the direction, while the louver blades installed in the lower outlet rotate in the direction opposite to that of the air discharged from the upper outlet to discharge the purified air in the opposite direction. The louver blades installed in the upper and lower outlets may be divided into regions, and the louver blades in each region may cooperate with each other. Thus, a variety of directions of discharged air can be embodied in the respective outlets at a time.

Hereinafter, the operation of the other embodiment of the refrigerator having the air-cleaner according to the present invention will be described in detail with reference to the accompanying drawings.

FIGS. 15 to 17 show the operational states of the louver blades of the embodiment shown in FIG. 13.

First, when a user operates the air-cleaner 10, the blower operates. Therefore, air is sucked in the case 12 through the inlets I of the case 12. The air sucked in the case 12 is purified while passing the filter units.

Then, the continuous operation of the blower causes the air along with anions generated in the anion generator to be discharged indoors through the outlet O of the case 12. At this time, the directions of the discharged air can be controlled according to the rotation directions of the respective first and second louver blades B1 and B2 installed in both the regions A and B of the outlet O of the case 12

In detail, obstacles such as other electric home appliances or walls may be positioned in a side of the front of the air-cleaner 10, i.e., to the right or left side in the figures. In such a case, as shown in FIG. 15 or 16, the first and second louver blades B1 and B2 are caused to rotate in the direction opposite to that in which the obstacles are positioned, i.e., to the left or right side in the figures. Therefore, the purified air discharged from the respective regions A and B of the outlet O is discharged in the direction so as not to interfere with the obstacles.

In the meantime, obstacles may be positioned in the middle of a front region of the air-cleaner 10. In such a case, as shown in FIG. 17, the first and second louver blades B1 and B2 are caused to rotate in opposite directions, i.e., to the right and the left side in the figures. Therefore, the purified air discharged from the respective regions A and B of the outlet O is discharged in both directions so as not to interfere with the obstacles, thereby effectively supplying the purified air to a broader space.

It will be apparent that those skilled in the art can make various modifications thereto within the scope of the fundamental technical spirit of the present invention. The true scope of the present invention should be defined on the basis of the appended claims.

The invention claimed is:

1. A refrigerator, comprising:
a main body having a predetermined storage space defined therein; and
an air-cleaner including a case fixed to the main body and having at least one inlet and at least one outlet, a decor panel that linearly reciprocates in a fore and aft direction by parallel shifting to selectively open and close the at least one outlet, a filter device that filters air sucked through the at least one inlet, a blower that sucks air through the at least one inlet and discharges the air filtered in the filter device through the at least one outlet, and an anion generator that generates anions which are discharged along with the air through the at least one outlet, wherein a gear connected to a step motor is provided in a portion of the case, a rack meshed with the gear is provided on a rear surface of the decor panel and extends in the fore and aft direction, and wherein the rack moves in the fore and aft direction so that the decor panel linearly reciprocates in the fore and aft direction of the case when the gear is rotated due to the operation of the step motor.

2. The refrigerator as claimed in claim 1, wherein a decor housing that defines a front external appearance of the case includes a rack through-opening, through which the rack passes, a hook through-opening, trough which a catching hook passes, and a guide portion that guides the rack and the catching hook, which pass through the rack through-opening and hook through-opening, respectively.

3. The refrigerator as claimed in claim 1, wherein the air-cleaner further includes a stopping device that controls linear reciprocation of the decor panel.

4. The refrigerator as claimed in claim 3, wherein the stopping device comprises a catching hook provided on one of the case and the decor panel and a stopper provided on the other of the case and the decor panel, and the catching hook is caught by the stopper to prevent the decor panel from being fully detached from a front of the case when the decor panel moves to the front of the case to open the at least one outlet.

5. The refrigerator as claimed in claim 1, wherein the filter device includes at least one filter that purifies the air sucked through the at least one inlet, a filter basket in which the at least one filter is seated, and a filter drawer detachably installed in the case in a state in which the filter basket is placed on the basket drawer.

6. The refrigerator as claimed in claim 5, wherein the at least one filter includes an antibiotic filter that eliminates bacteria in the air sucked through the at least one inlet, a first dust collection filter that filters out oil in the air passed through the antibiotic filter, a second dust collection filter that filters out dust in the air passed through the first dust collection filter, and a deodorizing filter that removes odor in the air passed through the second dust collection filter.

7. The refrigerator as claimed in claim 5, wherein the filter basket includes:
a basket main body provided with a filter seating space and in the shape of a hexahedron, an upper face and both longitudinal side faces of which are open;
a plurality of support ribs provided on both the open side faces of the basket main body and formed stepwise from an entrance of the seating space toward an interior of the basket main body; and
a plurality of guide ribs provided on front and rear inner and floor surfaces of the basket main body that fixes the at least one filter seated in the seating space at a predetermined position, wherein the filter basket is injection molded using two molds.

8. The refrigerator as claimed in claim 1, wherein the air-cleaner further comprises a vibration prevention a device that prevents vibration generated during the operation of the blower from being transmitted to the air-cleaner and the main body.

9. The refrigerator as claimed in claim 8, wherein the vibration prevention device includes:
a plurality of support bosses provided at corresponding positions of ceiling and floor surfaces of the case, each having a distal end extending in a direction in which the plurality of support bosses face each other to be contiguous to an upper or lower surface of the blower;
a plurality of side guides that protrudes from the distal ends of the plurality of support bosses in a direction in which the plurality of side guides face each other and formed in a shape corresponding to a side surface of a fan housing;
a plurality of sealing portions provided on each of the plurality of side guides and brought into close contact with the side surface of the fan housing; and
a plurality of shock absorbing portions provided on the distal ends of the plurality of support bosses and brought into close contact with the upper or lower surface of the blower.

10. The refrigerator as claimed in claim 1, further comprising a mounting bracket having a plurality of fixing portions fixed to a bottom surface of the case and a fastening portion fastened to an upper surface of the main body, the mounting bracket being configured to mount the air-cleaner to the main body with an elastic force of the fastening portion with respect to the plurality of fixing portions.

11. The refrigerator as claimed in claim 10, wherein each of the plurality of fixing portions is provided with a fastening hole, through which a fastener fastened to the bottom surface of the case penetrates, and wherein the fastening portion is provided with a passing hole, through which a head of an engaging pin fixed to the upper surface of the main body penetrates, and a slit, to which the head of the engaging pin, which penetrates, the passing hole is fixed by the elastic force in a state in which the head of the engaging pin is fitted therein.

12. A refrigerator, comprising:
a main body having a predetermined storage space defined therein; and
an air-cleaner including a case fixed to the main body and having at least one inlet and at least one outlet, a decor panel that linearly reciprocates in a fore and aft direction by parallel shifting to selectively open and close the at least one outlet, a filter device that filters air sucked through the at least one inlet, and a blower that sucks air through the at least one inlet and discharges the air filtered in the filter device through the at least one outlet, wherein the filter device includes at least one filter that purifies the air sucked through the at least one inlet, a filter basket in which the at least one filter is seated, and a basket drawer detachably installed in the case in a state in which the filter basket is placed on the basket drawer, wherein a gear connected to a step motor is provided in a portion of the case, a rack meshed with the gear is provided on a rear surface of the decor panel and extends in the fore and aft direction, and wherein the rack moves in the fore and aft direction so that the decor panel linearly reciprocates in the fore and aft direction of the case when the gear is rotated due to the operation of the step motor.

13. The refrigerator as claimed in claim 12, wherein the at least one filter includes an antibiotic filter that eliminates bacteria in the air sucked through the at least one inlet, a first dust collection filter that filters out oil in the air passed through the antibiotic filter, a second dust collection filter that filters out dust in the air passed through the first dust collection filter, and a deodorizing filter that removes odor in the air passed through the second dust collection filter.

14. The refrigerator as claimed in claim 13, wherein the filter basket includes:
a basket main body provided with a filter seating space and in the shape of a hexahedron, an upper face and both longitudinal side faces of which are open;
a plurality of support ribs provided on both the open side faces of the basket main body and formed stepwise from an entrance of the seating space toward an interior of the basket main body; and
a plurality of guide ribs provided on front and rear inner and floor surfaces of the basket main body that fixes the at least one filter seated in the seating space at a predetermined position, wherein the filter basket is injection molded using two molds.

15. A refrigerator, comprising:
a main body having a predetermined storage space defined therein; and
an aft-cleaner including a case fixed to the main body and having at least one inlet and at least one outlet, a decor panel that linearly reciprocates in a fore and aft direction by parallel shifting to selectively open and close the at least one outlet, a filter device that filters air sucked through the at least one inlet, a blower that sucks air through the at least one inlet and discharges the air filtered in the filter device through the at least one outlet, and a vibration prevention device that prevents vibration generated during the operation of the blower from being transmitted to the all-cleaner and the main body, wherein the vibration prevention device include:
a plurality of support bosses provided at corresponding positions of ceiling and floor surfaces of the cases, each having a distal end extending in a direction in which the plurality of support bosses face each other to be contiguous to an upper or lower surface of the blower;
a plurality of side guides that protrudes from the distal ends of the plurality of support bosses in a direction in which the plurality of side guides face each other and formed in a shape corresponding to a side surface of a fan housing;
a plurality of sealing portions provided on each of the plurality of side guides and brought into close contact with the side surface of the fan housing; and
a plurality of shock absorbing portions provided on the distal ends of the plurality of support bosses and brought into close contact with the upper or lower surface of the blower, wherein a gear connected to a step motor is provided in a portion of the case, a rack meshed with the gear is provided on a tear surface of the decor panel and extends in the fore and aft direction, and wherein the rack moves in the fore and aft direction so that the decor panel linearly reciprocates in the fore and aft direction of the case when the gear is rotated due to the operation of the step motor.

16. A refrigerator, comprising:
a main body having a predetermined storage space defined therein;
an air-cleaner including a case fixed to the main body and having at least one inlet and at least one outlet, a decor panel that linearly reciprocates in a fore and aft direction by parallel shifting to selectively open and close the at least one outlet, a filter device that filters air sucked through the at least one inlet, and a blower that sucks air through the at least one inlet and discharges the air filtered in the filter device through the at least one outlet; and
a mounting bracket including a plurality of fixing portions fixed to a bottom surface of the case and a fastening portion fastened to an upper surface of the main body, the mounting bracket being configured to mount the air-cleaner to the main body with an elastic force of the fastening portion with respect to the plurality of fixing portions, wherein a gear connected to a step motor is provided in a portion of the case, a rack meshed with the gear is provided on a rear surface of the decor panel and extends in the fore and aft direction, and wherein the rack moves in the fore and aft direction so that the decor panel linearly reciprocates in the fore and aft direction of the case when the gear is rotated due to the operation of the step motor.

17. The refrigerator as claimed in claim 16, wherein each of the plurality of fixing portions is provided with a fastening hole, through which a fastener fastened to the bottom surface of the case penetrates, and wherein the fastening portion is provided with a passing hole, through which a head of an engaging pin fixed to the upper surface of the main body penetrates, and a slit, to which the head of the engaging pin, which penetrates, the passing hole is fixed by the elastic force in a state in which the head of the engaging pin is fitted therein.

18. A refrigerator, comprising:
a main body having a predetermined storage space defined therein; and
an air-cleaner including a case fixed to the main body and having at least one inlet and at least one outlet, a decor panel that linearly reciprocates in a fore and aft direction by parallel shifting to selectively open and close the at least one outlet, a plurality of louver blades that guides air discharged through the at least one outlet in at least two directions, a filter device that filters air sucked through the at least one inlet, a blower that sucks air through the at least one inlet and discharges the air filtered in the filter device through the at least one outlet, and an anion generator that generates anions which ate discharged along with the air through the at least one outlet, wherein a gear connected to a step motor is provided in a portion of the case, a rack meshed with the gear is provided on a tear surface of the decor panel and extends in the fore and aft direction, and wherein the rack moves in the fore and aft direction so that the decor panel linearly reciprocates in the fore and aft direction of the case when the gear is rotated due to the operation of the step motor.

19. The refrigerator as claimed in claim 18, wherein the plurality of louver blades is vertically installed side by side in each of at least two regions into which the outlet is divided, and upper and lower ends of the plurality of louver blades installed in each of the at least two regions are connected to each other, respectively.

20. The refrigerator as claimed in claim 19, wherein the plurality of louver blades installed in the respective at least two regions is rotated selectively in the same or opposite directions.

21. The refrigerator as claimed in claim 18, wherein the at least one outlet is divided into a plurality of regions formed vertically stepwise.

* * * * *